(12) United States Patent
Ovcharenko

(10) Patent No.: US 12,313,496 B2
(45) Date of Patent: May 27, 2025

(54) SLIDE BEARING CHARACTERISTICS CONTROLLING METHOD AND ITS IMPLEMENTATION

(71) Applicant: Nikolay Ovcharenko, Berlin (DE)

(72) Inventor: Nikolay Ovcharenko, Berlin (DE)

( * ) Notice: Subject to any disclaimer, the term of this patent is extended or adjusted under 35 U.S.C. 154(b) by 175 days.

(21) Appl. No.: 18/286,435

(22) PCT Filed: Jul. 6, 2021

(86) PCT No.: PCT/RU2021/050203
§ 371 (c)(1),
(2) Date: Oct. 11, 2023

(87) PCT Pub. No.: WO2022/124936
PCT Pub. Date: Jun. 16, 2022

(65) Prior Publication Data
US 2024/0209894 A1 Jun. 27, 2024

(30) Foreign Application Priority Data
Dec. 9, 2020 (RU) .......................... RU2020140610

(51) Int. Cl.
*G01M 13/045* (2019.01)
*F16C 17/02* (2006.01)
(Continued)

(52) U.S. Cl.
CPC .......... *G01M 13/045* (2013.01); *F16C 17/02* (2013.01); *F16C 17/243* (2013.01);
(Continued)

(58) Field of Classification Search
CPC ...... F16C 17/02; F16C 17/243; F16C 17/246; F16C 33/109; F16C 33/20; F16C 33/201;
(Continued)

(56) References Cited

U.S. PATENT DOCUMENTS

| 4,501,534 A | 2/1985 | Hargis |
| 4,948,269 A | 8/1990 | Hamilton |

(Continued)

FOREIGN PATENT DOCUMENTS

| DE | 102010019285 A1 * | 11/2011 | .............. F16C 33/10 |
| RU | 166258 | 11/2016 | |
| SU | 1530848 | 12/1989 | |

*Primary Examiner* — Phillip A Johnson
(74) *Attorney, Agent, or Firm* — Bauer and Joseph

(57) ABSTRACT

A method for regulating the physical properties of slide bearings during operation. The method controls the bearing modulus (Hersey number) s of a slide bearing and includes the steps of: (a) determining the temperature dependence of the dynamic viscosity of the bearing lubricant; (b) determining the mixed-film lubrication to hydrodynamic lubrication transition temperature of the bearing; (c) determining, on the basis of the temperature dependence of the dynamic viscosity of the lubricant, the temperature dependence of the bearing modulus $\lambda(T)$ and the value of the bearing modulus $\lambda_{cr}$ of the mixed-film lubrication to hydrodynamic lubrication transition of the bearing; (d) measuring the operating temperature of the bearing; (e) regulating the value of the operating temperature of the bearing in order to keep the operating value of the bearing modulus $\lambda_{perf}$ close to $\lambda_{cr}$ in a range corresponding to the transition between mixed-film lubrication and hydrodynamic lubrication.

6 Claims, 4 Drawing Sheets

(51) Int. Cl.
*F16C 17/24* (2006.01)
*F16C 33/20* (2006.01)

(52) U.S. Cl.
CPC ............ *F16C 17/246* (2013.01); *F16C 33/20* (2013.01); *F16C 2233/00* (2013.01); *F16C 2240/06* (2013.01); *F16C 2240/12* (2013.01); *F16C 2240/26* (2013.01)

(58) Field of Classification Search
CPC .............. F16C 2233/00; F16C 2240/06; F16C 2240/12; F16C 2240/26; G01M 13/04; G01M 13/045
See application file for complete search history.

(56) References Cited

U.S. PATENT DOCUMENTS

2003/0013615 A1* 1/2003 Levy .................... F16C 33/109
508/113
2019/0170257 A1* 6/2019 Hosoe .................... F16C 33/22

* cited by examiner

SLIDE BEARING CHARACTERISTICS CONTROLLING METHOD AND ITS IMPLEMENTATION

CROSS REFERENCE TO RELATED APPLICATIONS

The present application is a U.S. national stage application of PCT International Application No. PCT/RU2021/050203, filed Jul. 6, 2021, and published as PCT Publication WO/2022/124936 on Jun. 16, 2022, which claims priority to Russian Application No. 2020140610, filed on Dec. 9, 2020. The disclosures of the foregoing applications are hereby incorporated by reference in their entirety into the present application.

TECHNICAL FIELD

The disclosure relates to slide bearings, specifically to methods for regulating the physical properties of the slide bearings in operation.

TECHNICAL BACKGROUND

The further terminology and designations are used in accordance with GOST ISO 7902-1-2001, 18282-88.

The most important performance characteristics of a slide bearing are the related eccentricity $\epsilon$, the related thickness of lubricant film $\xi = 1-\epsilon$ associated with it, and the bearing modulus (Hersey number) c $\lambda = \eta \omega_B / p$. A stable performance of the slide bearing in the field of reliable hydrodynamic lubrication is possible with the values of $0.1 < \xi < 0.3$ and $\lambda > \lambda_{cr}$, at which a lubrication layer reliably separates the rotating parts of the bearing and at the same time preserves the vibrational resistance to self-oscillations of the shaft.

The terms bearing modulus and Hersey number are used interchangeably herein.

The existing theoretical methods for designing slide bearings are highly approximate and based on a large number of assumptions, in particular: (1) the lubricant conforms to a Newtonian liquid; (2) the geometry of the article ideally conforms to theoretical equations; (3) oscillations are insignificant; (4) the physical parameters of the lubricant (viscosity, pressure, layer thickness, etc.) are constant in the axial direction; (5) the dynamic viscosity is assumed to be a constant $\eta_{eff}$ in the entire range of operating temperatures; (6) reversible and irreversible changes in the viscosity are not taken into account; exact temperatures of the lubricant film, shaft, and bearing, which define the variation in the related clearance of the bearing as a function of temperature, are replaced with mean values of $T_{eff}$; (7) roughness of friction surfaces are assumed to be unchanged; (8) the value of the friction coefficient is calculated by rough approximation of the Petrov and Vogelpohl formulas; (9) changes in rigidity and hardness of the surface of the shaft and the bearing are not taken into account; (10) the heat dissipation from the bearing to the surrounding environment is not taken into account.

In addition to these assumptions, the real properties of slide bearings vary significantly in the course of prolonged operation and deviate even more from the ideal ones.

SUMMARY OF THE INVENTION

In various implementations, a method of controlling a bearing modulus for a slide bearing is provided. A temperature dependence of the dynamic viscosity of a lubricant of the slide bearing is determined. A mixed-film lubrication to hydrodynamic lubrication transition temperature of the slide bearing is determined. The temperature dependence of the bearing modulus $\lambda(T)$ and a value of the bearing modulus $\lambda_{cr}$ of the mixed-film lubrication to hydrodynamic lubrication transition of the slide bearing is determined on the basis of the temperature dependence of the dynamic viscosity of the lubricant. An operating temperature of the slide bearing is measured. A value of the operating temperature of the slide bearing is regulated to maintain the operating value of the bearing modulus $\lambda_{perf}$ close to $\lambda_{cr}$ in a range that is transitional between mixed-film lubrication and hydrodynamic lubrication.

DETAILED DESCRIPTION OF THE INVENTION

Figure 1:
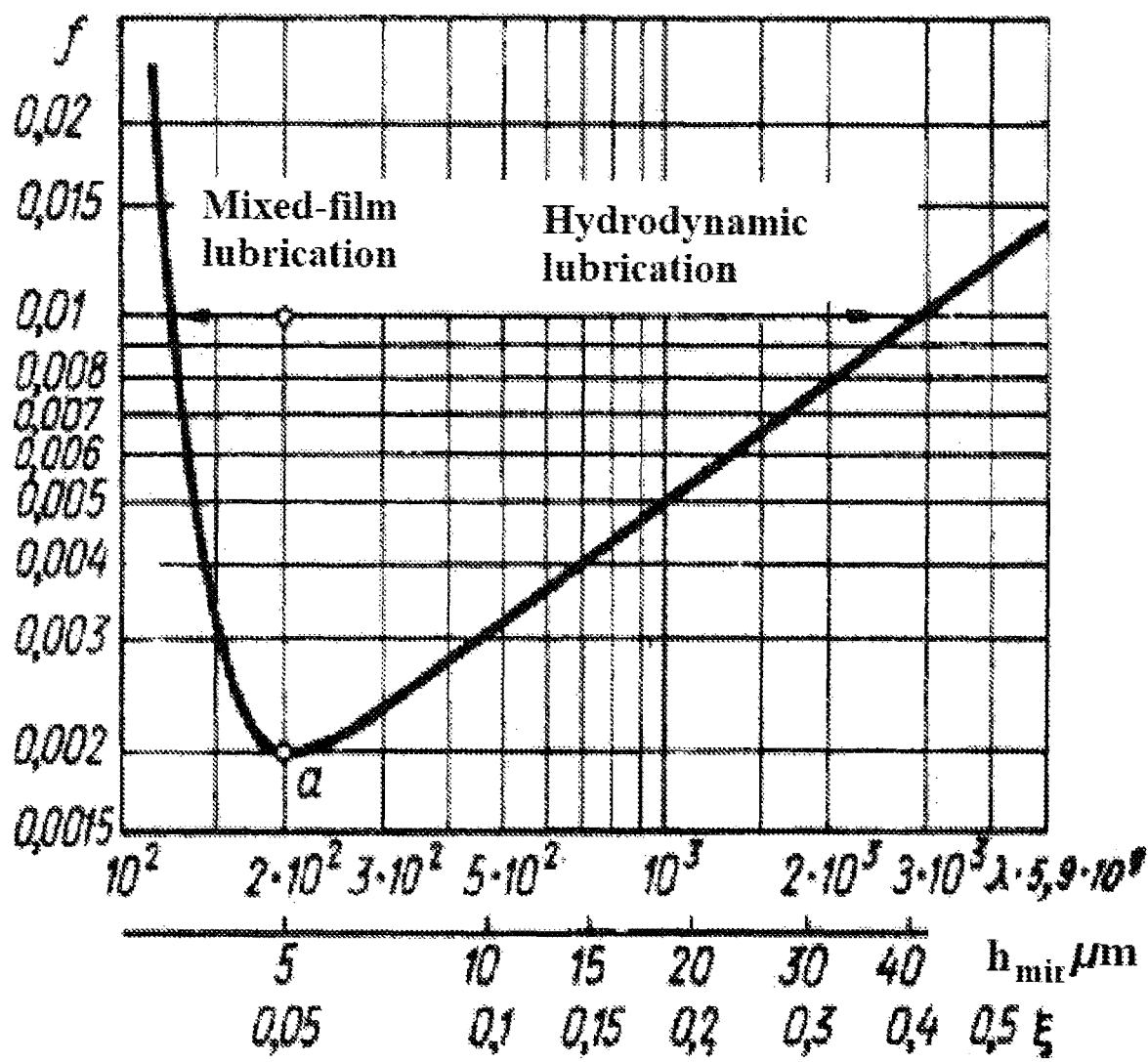
FIG. 1 is a graph of the coefficient of friction as a function of the bearing modulus, the absolute and related thickness of the lubricant film $h_{min}$ and $\xi$ (the Hersey-Stribeck curve).

The methods used at present to maintain a stable operating performance of a bearing involve increasing the factor of safety $\kappa(\lambda/\lambda_{cr}$ ratio) such that the bearing modulus (Hersey number) coming close to the critical values can be avoided as much as possible, since the antifriction materials most often used (tin babbitts, lead babbitts, lead bronzes, aluminum alloys, etc.) are quickly disrupted under conditions of mixed-film and boundary lubrication. FIG. 1 shows a graph of the coefficient of friction as a function of the bearing modulus, the absolute and related thickness of the lubricant film $h_{min}$ and $\xi$ (the Hersey—Stribeck curve). The narrow zone of the mixed-film lubrication near point a makes it necessary to avoid the risk of a transition to the zone of boundary friction (to the left of a) and operate the articles in the zone of hydrodynamic lubrication with a high factor of safety.

By way of example, the numerical parameters may be used, for example for a shaft of d=80 mm, l/d=1 and bearing modulus $\xi=17*10^{-8}$. In the classical design of the bearing, the values of the maximum and minimum clearance are $\xi=0.15-0.7$, $\kappa=3.1-8.4$, $f=0.027-0.05$. In this case, the calculated coefficient of friction close to the critical bearing modulus $\lambda_{cr}$ (point a in FIG. 1) is $f_{cr}=0.0015$, which indicates a more than threefold excess in the friction losses in the working mode as compared to the critical mode.

The claimed method is based on the use of the properties of modern antifriction materials for varying the bearing parameters with no mechanical intervention, in particular, varying the friction coefficient, the related clearance, and the viscosity of the lubricant. The range of the parameter data is determined by the choice of the antifriction material with corresponding physical properties, and they are varied by changing the temperature in the friction zone of the bearing. As a result, control of the output characteristics of the friction unit may be achieved, particularly control of rotations and load, which expands the range of the performance characteristics of the friction unit; of friction, which reduces the friction losses, the heat dissipation, the oil consumption, and lowers the starting torque; the wear on the antifriction layer, which increases the service life and allows for breaking-in of the surface and the shape; and the clearances, which reduces self-oscillations and vibrations in different frequency ranges.

Figure 2:
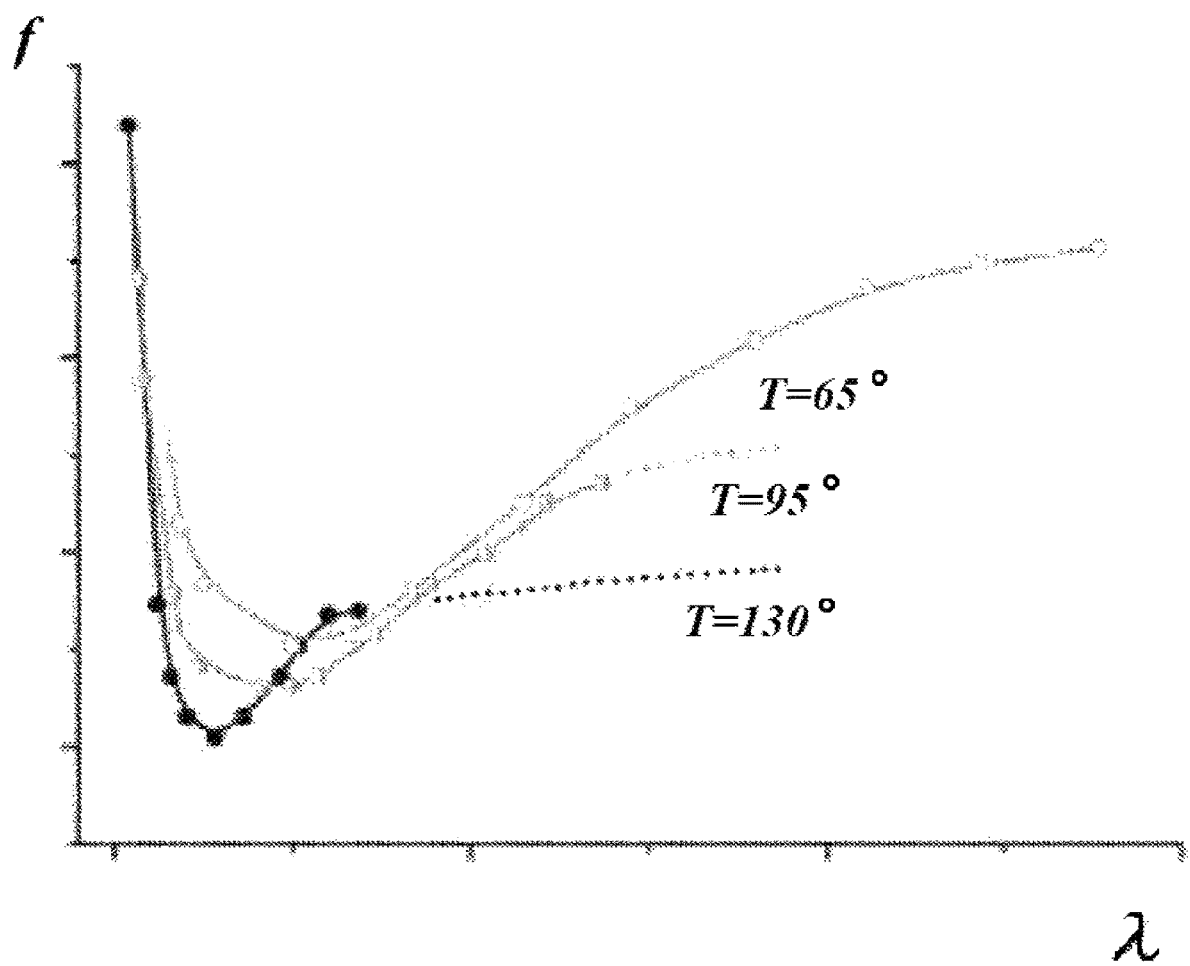
FIG. 2 is a graph illustrating the influence of the temperature of the slide bearing on the coefficient of friction in different lubrication regimes.

FIG. 2 presents a graph illustrating the influence of the temperature of the slide bearing on the friction coefficient in various lubrication regimes and the condition for transition of the bearing to a mixed-film lubrication.

Table 1 shows the values for the minimum film thickness of lubricant film.

The physical properties of modern antifriction materials provide for good breaking-in of bearings for any types of lubrication. At the same time, the material roughness amounts to a few microns or less, allowing a significant decrease in the film thickness of lubricant film for a stable operation of the bearing, the bearing modulus λ, and the friction coefficient f (see Table 2).

Modern antifriction materials are able to operate at temperatures of minus 110 to plus 250° C., which allows the use of the viscosity of the used lubricants in a broad range of values, expanding the fluid lubrication regime in the direction of lower values of λ.

From the prior art, a technical solution is known aimed at lengthening the service life of a slide bearing (see U.S. Pat. No. 4,501,534, published 26 Feb. 1985), in which the speed of rotation is decreased in order to decrease the values of λ in air conditioning equipment, which is not always possible, except in the case of industrial equipment.

The dependency of physical characteristics (in particular, tensile and compressive limits, the modulus of elasticity, hardness, etc.) of antifriction materials on temperature allows varying of surface conditions for interaction of rubbing surfaces in slide bearings, which in turn allows decreasing of the breakaway torques and breaking-in not only of the roughness, but also the shape of the sliding surface of the bearings.

Control of the lubricant temperature also makes it possible to regulate the thermal expansion of the bearing parts and compensate for the clearances between the rubbing surfaces which are formed due to geometry deviations, design and fabrication errors, and frictional wear.

Technical solutions are known from the prior art, which are aimed in particular at compensating for clearances by introducing complex design changes in the bearing (see U.S. Pat. No. 8,303,185 published 9 Jul. 2010 and U.S. Pat. No. 7,559,697 published 14 Jul. 2009).

Technical solutions are known that are aimed at maintaining the temperature in bearings, for example, Chinese Patent Publication No. 110513398 published 29 Nov. 2019, Japanese Patent Publication No. JPH06134651, published 17 May 1994, U.S. Pat. No. 4,948,269 A published 14 Aug. 1990. However, these technical solutions are aimed at maintaining the temperature in roller bearings.

A system for heat dissipation from a roller bearing is disclosed in U.S. Pat. No. 4,948,269, published 14 Aug. 1990, in which the need to remove or supply heat from/to the bearing is determined on the basis of data obtained from thermostats which are designed to maintain the temperature in a given working range.

However, this method is aimed at controlling the operating condition of roller bearings, which have a different range of operating temperatures and different physical operating conditions as compared to slide bearings. The known method cannot be used to control the performance characteristic of the slide bearing.

A technical problem to be solved by the disclosure is to expand the functionality of the slide bearing and increase operating reliability thereof.

A technical result achieved by solving a technical problem is reducing friction losses during the operation of the slide bearing and decreasing starting torque thereof while at the same time expanding operational characteristics of the bearing without altering its design, reducing the influence of errors in design and fabrication of the bearing on its operation, and simplifying the design of the slide bearing by eliminating the need to introduce design changes in the bearing in order to protect it against overheating during operation.

The technical problem is solved, and the technical result is achieved, by virtue of the fact that the method for controlling a performance characteristic of a slide bearing includes the steps of: (a) determining the temperature dependence of the dynamic viscosity of the bearing lubricant; (b) determining the mixed-film lubrication to hydrodynamic lubrication transition temperature of the bearing; (c) determining, on the basis of the temperature dependence of the dynamic viscosity of the lubricant, the temperature dependence of the bearing modulus $\lambda(T)$ and the value of the bearing modulus $\lambda_{cr}$ of the mixed-film lubrication to hydrodynamic lubrication transition of the bearing; (d) measuring the operating temperature of the bearing; (e) regulating the value of the operating temperature of the bearing in order to keep the operating value of the bearing modulus $\lambda_{perf}$ close to $\lambda_{cr}$ in a range corresponding to the transition between mixed-film lubrication and hydrodynamic lubrication. Preferably, $\lambda_{perf}$ is maintained in the range of $1.05*\lambda_{cr} \geq \lambda_{perf} \geq 1.10*2\lambda_{cr}$.

A technical problem is solved, and a technical result is achieved, likewise in the following embodiment of the method.

In the method for controlling a bearing modulus of the slide bearing, in step (b) it is possible to regulate the value of the operating temperature of the slide bearing by means of varying one or more parameters from the following group: temperature of the lubricant of the slide bearing; temperature of the rubbing parts of the bearing; external temperature influence on the slide bearing; temperature of the housing of the slide bearing; flow rate of the lubricant in the friction zone.

An embodiment of a slide bearing that can be used to implement the provided method and which is provided with an antifriction working surface and includes a temperature sensor able to measure the current operating temperature of the slide bearing.

In one embodiment of the slide bearing, the antifriction working surface can be configured based on antifriction polymer materials.

In another embodiment, the slide bearing can further include one or more sensors from the following group: a speed sensor; a pressure sensor; temperature sensors for friction surfaces of the bearing; a temperature sensor for the lubricant; a temperature sensor for the bearing housing; a torque sensor; position sensors; vibrational sensors; a power consumption sensor.

By detecting the temperature and the bearing modulus $\lambda_{cr}$ of the transition of the slide bearing from mixed-film lubrication to hydrodynamic lubrication and then maintaining the bearing modulus $\lambda_{perf}$ close to $\lambda_{cr}$ in a range that is transitional between mixed-film lubrication and hydrodynamic lubrication by means of regulating the operating temperature of the slide bearing, it becomes possible to reduce the power losses from friction and reduce the influence of errors and defects on the rubbing surfaces of the slide bearing. In addition, by maintaining the bearing modulus $\lambda_{perf}$ close to $\lambda_{cr}$, there is no need to make design changes to the slide bearing aimed at constant cooling of the bearing during its operation, since there is no possibility of the bearing reaching temperature values surpassing its operating capabilities. In other words, the design of the bearing is simplified, which in turn enables both a simplification of the fabrication of the bearing and an easier operation thereof. Because, as was shown above, the majority of the characteristics of the slide bearing depends on its operating temperature, regulating the value of the operating temperature of the bearing will allow a significant decrease in the influence of errors in the design and fabrication of the bearing on its operation.

Varying the bearing temperature prior to its starting allows decreasing the coefficients of static friction between the rubbing parts, which decreases the starting torque.

Thus, the claimed technical solutions provide for a reliable operation of the slide bearing and expand its functionality.

Figure 3:
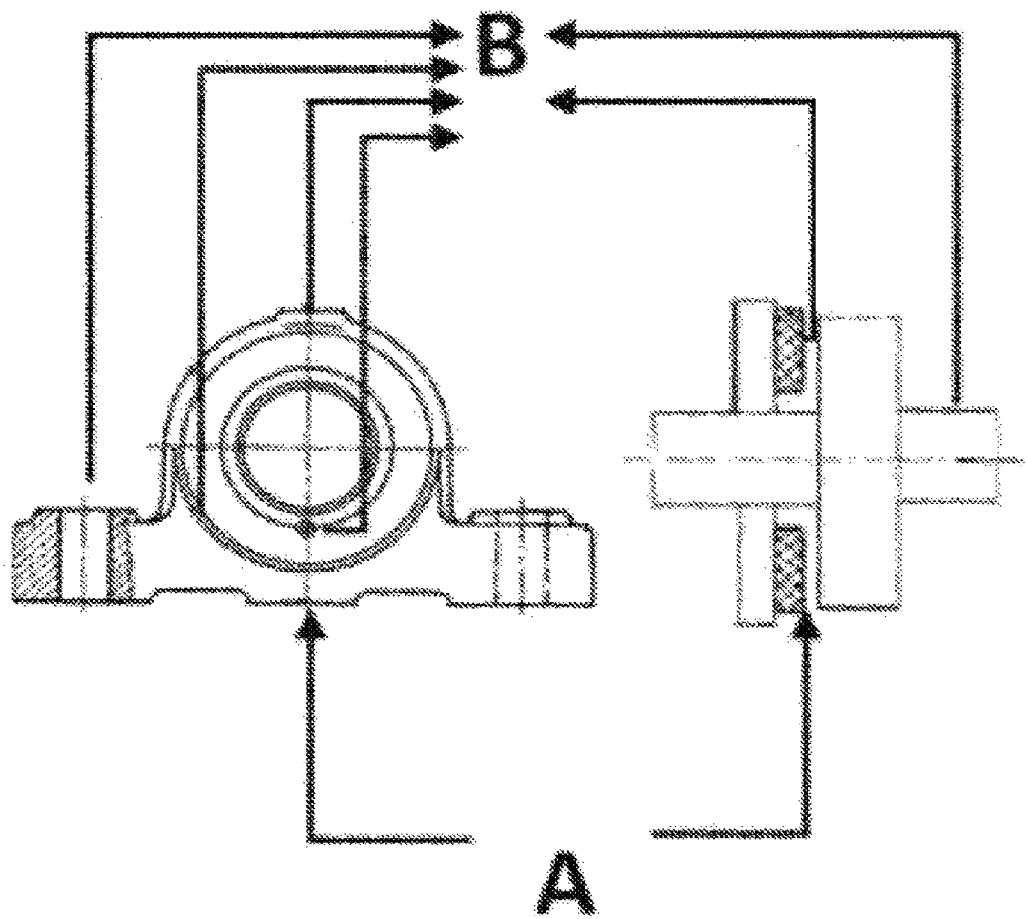
FIGS. 3-4 illustrate a process for controlling the performance characteristic of the slide bearing.
Figure 4:
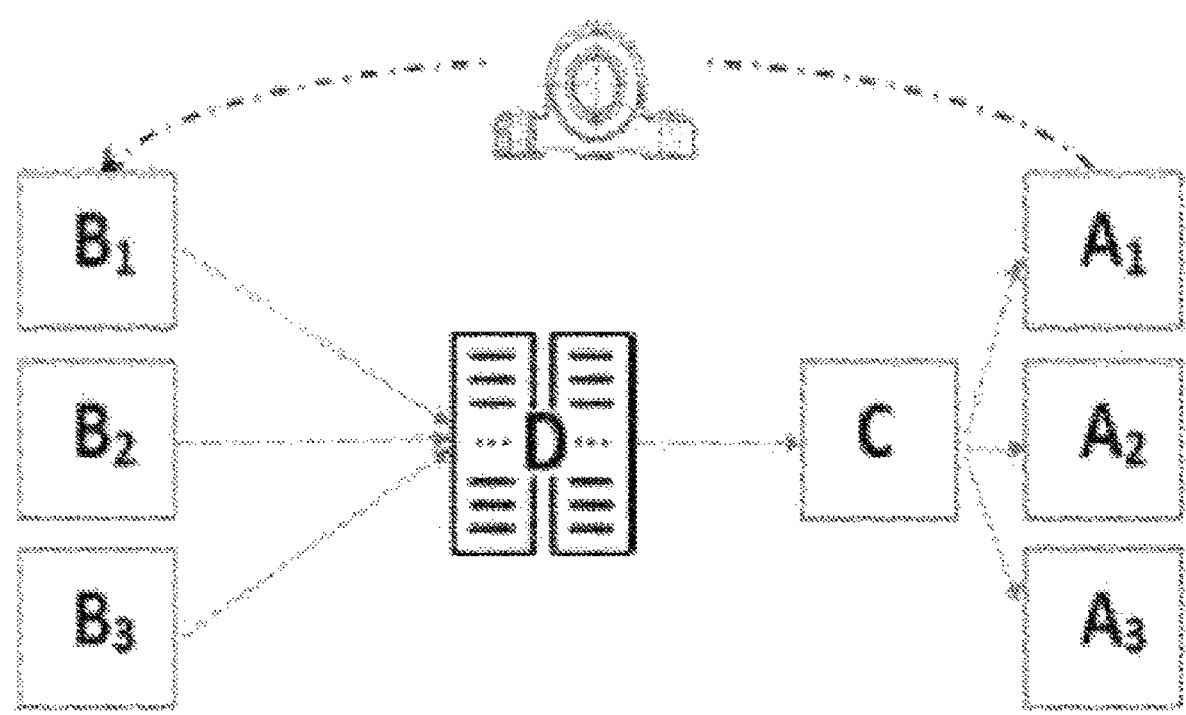

The claimed method of controlling the bearing modulus of the slide bearing is explained by drawings. FIG. 1 presents a graph of the coefficient of friction as a function of the bearing modulus, namely the absolute and related thickness of lubricant film $h_{min}$ and $\xi$. FIG. 2 presents a graph illustrating the influence of the temperature of the slide bearing on the coefficient of friction in different lubrication regimes. FIGS. 3-4 show schematically the process of controlling the bearing modulus of the slide bearing.

The provided method of controlling the bearing modulus of the slide bearing is implemented as follows.

The determination of the temperature dependence of the dynamic viscosity of the lubricant of the slide bearing and the temperature of the transition from mixed-film lubrication to hydrodynamic lubrication affords the possibility of determining the temperature dependence of the bearing modulus $\lambda(T)$ for the bearing with any lubricant known to one skilled in the art. Based on the transition temperature value, it is possible to determine the value of the bearing modulus $\lambda_{cr}$ for the transition of the slide bearing from mixed-film lubrication to hydrodynamic lubrication. After measuring the current operating temperature of the slide bearing by means of a temperature sensor situated inside the bearing, it becomes possible to regulate the value of the operating temperature of the slide bearing to maintain the operating value of the bearing modulus $\lambda_{perf}$ close to $\lambda_{cr}$ in a range that is transitional between mixed-film lubrication and hydrodynamic lubrication, preferably in the range of $1.05*\lambda_{cr} \leq \lambda_{perf} \leq 1.10*\lambda_{cr}$, based on the obtained temperature dependence $\lambda(T)$. Such a regulating can be realized by varying one or more parameters of the slide bearing: temperature of the lubricant of the slide bearing; temperature of the rubbing parts of the bearing; external thermal influence on the slide bearing; temperature of the housing of the slide bearing; flow rate of the lubricant in the friction zone.

The provided method is a flexible tool for changing the characteristics of the bearing to accomplish a broad range of tasks. The following embodiments can be given as exemplary embodiments of the method.

EXAMPLE 1

Changing the operating temperature of the bearing by changing the temperature of a frictional pair directly in the friction zone by changing the temperature of the antifriction layer and/or that of rubbing parts of the bearing (shaft, shaft journals, pads, cushions, liners, separators, etc.).

EXAMPLE 2

Changing the operating temperature of the bearing by changing the lubricant temperature in the bearing by changing the temperature of the lubricant at the inlet of the bearing, by changing the feed rate (consumption) of the lubricant in the friction zone, by changing the conditions of heat dissipation in the lubricant cooling zones, by heating the lubricant in storage devices or feeding devices, and so forth.

EXAMPLE 3

Changing the operating temperature of the bearing by changing the temperature of the bearing housing by changing the conditions for heat dissipation to the surrounding environment, by changing the temperature of the surrounding environment, by heating the bearing housing, and so forth.

The slide bearing for the implementation of the method for controlling the bearing modulus of the slide bearing can be any slide bearing known to one skilled in the art, which is provided with an antifriction working surface and which includes a thermal sensor able to measure the current operating temperature of the slide bearing. The antifriction working surface can be configured based on antifriction polymer materials.

Design elements A (see FIGS. 3-4) are used for controlling the temperature and thermal parameters of the slide bearing. For example, they include:

heating elements inside the structure of the bearing for regulating the temperature of the rubbing parts, in particular pads, liners, shaft journals, separators, and so forth; or heating element inside and outside an oil system of the slide bearing, means of controlling the oil flow rate, means of controlling the power of the forced heat dissipation to regulate the temperature of the lubricant at the inlet to the bearing, the lubricant flow rate, the heat dissipating power of an oil cooler, the power of a heating device of a crankcase, the power of a heating device of an oil collector, the power of a heating device of an oil line; or regulated air or other cooling of the housing of the bearing, heating elements inside the bearing housing to regulate the mean temperature of the bearing housing, the temperature of the surrounding environment, the rate of air cooling, the heat dissipating power of the bearing housing, the heating power of the bearing housing.

All of the mentioned design elements are provided as examples and can have any desired design implementation known to one skilled in the art, this design embodiment not being a subject of consideration of the present application.

The value of the characteristics of the bearing $\Psi_i$ is registered using installed sensors B, in particular a speed sensor; a pressure sensor; temperature sensors for the friction surfaces of the bearing; temperature sensors for the lubricant; temperature sensors for the bearing housing; torque sensors; position sensors; vibration sensors; a power consumption sensor, and so forth.

The regulating signals are transmitted to the elements A by means of control units C, which may be integrated, for example, in the enterprise control system, or any other information system D providing for data collection B, analysis, predicting and feedback thereof.

The operator may select one or more characteristics of the bearing $\Psi_i(T_i)$, which need to be controlled by varying the temperature or thermal parameters, for example:
- the operating mode, in particular, starting, stopping, workload and speed;
- the power of frictional forces, to be determined, for example, through the temperature of the lubricant at the inlet from the slide bearing and the flow rate of lubricant;
- the moment of static friction forces (starting torques);
- the rate of wear of the antifriction layer to be determined by direct measurements of clearances (e.g., by means of sensors) and/or the vibrational characteristics, etc.;
- the vibrational characteristics.

The choice of any other characteristics of the slide bearing or combinations thereof not indicated in the present specification as characteristics controlled by means of temperature or thermal parameters does not limit the application of the disclosed method to the methods for controlling other selected characteristics.

TABLE 1

Table 1 Presently used values of the minimum film thickness of lubricant film.

TABLE 1

| Shaft diameter, mm | $h_{min}$, μm for shaft sliding speed $U_J$, m/s | | | | |
|---|---|---|---|---|---|
| | $U_J \leq 1$ | $1 < U_J \leq 3$ | $3 < U_J \leq 10$ | $10 < U_J \leq 30$ | $30 < U_J$ |
| $24 < D_J \leq 63$ | 3 | 4 | 5 | 7 | 10 |
| $63 < D_J \leq 160$ | 4 | 5 | 7 | 9 | 12 |
| $160 < D_J \leq 400$ | 6 | 7 | 9 | 11 | 14 |
| $400 < D_J \leq 1000$ | 8 | 9 | 11 | 13 | 16 |
| $1000 < D_J < 2500$ | 10 | 12 | 14 | 16 | 18 |

TABLE 2

| sample number | Material Root-mean-square value of the height of material surface roughness, μm | |
|---|---|---|
| | before friction trials | after friction trials |
| A | 1.4 ± 0.1 | 0.4 ± 0.1 |
| B | 5.8 ± 2.6 | 2.7 ± 0.7 |
| C | 2.0 ± 0.5 | 1.1 ± 0.2 |
| D | 2.1 ± 0.5 | 1.6 ± 0.2 |
| E | 3.2 ± 1.2 | 2.1 ± 1.2 |
| F | 6.4 ± 1.3 | 1.4 ± 0.2 |
| G | 3.8 ± 0.5 | 1.6 ± 0.4 |
| H | 6.5 ± 5.6 | 3.6 ± 1.6 |
| I | 6.1 ± 2.6 | 3.3 ± 0.9 |

Table 2 includes the root-mean-square value of the height of material surface roughness, μm, for each sample.

What is claimed is:

1. A method of controlling a bearing modulus for a slide bearing, comprising the steps of:
   (a) determining a temperature dependence of the dynamic viscosity of a lubricant of the slide bearing;
   (b) determining a mixed-film lubrication to hydrodynamic lubrication transition temperature of the slide bearing;
   (c) on the basis of the temperature dependence of the dynamic viscosity of the lubricant, determining the temperature dependence of the bearing modulus $\lambda(T)$ and a value of the bearing modulus $\lambda_{cr}$ of the mixed-film lubrication to hydrodynamic lubrication transition of the slide bearing;
   (d) measuring an operating temperature of the slide bearing; and
   (e) regulating a value of the operating temperature of the slide bearing to maintain the operating value of the bearing modulus $\lambda_{perf}$ close to $\lambda_{cr}$ in a range that is transitional between mixed-film lubrication and hydrodynamic lubrication.

2. A method according to claim 1, wherein in step (e) the operating value of the bearing modulus $\lambda_{perf}$ is maintained in the range of $1.05*\lambda_{cr} \geq \lambda_{perf} \geq 1.10*2\lambda_{cr}$.

3. A method according to claim 1, wherein in step (e) the value of the operating temperature of the slide bearing is regulated by means of varying one or more parameters from the following group: the temperature of the lubricant of the slide bearing; the temperature of the rubbing parts of the bearing; the external temperature influence on the slide bearing; the temperature of the housing of the slide bearing; the flow rate of the lubricant in the friction zone.

4. The method of claim 1, further comprising:
   providing the slide bearing with the slide bearing having an antifriction working surface and a temperature sensor able to measure the current operating temperature of the slide bearing.

5. The method of claim 1, further comprising:
   providing the slide bearing with the slide bearing having an antifriction working surface and a temperature sensor able to measure the current operating temperature of the slide bearing with the slide bearing antifriction working surface being configured based on antifriction polymer materials.

6. The method of claim 1, further comprising:
   providing the slide bearing with the slide bearing having an antifriction working surface and a sensor with the sensor being a sensor selected from the group consisting of a speed sensor, a pressure sensor, a temperature sensor for at least one friction surface of the bearing, a temperature sensor for the lubricant, a temperature sensor for the bearing housing, a torque sensor, a position sensor, a vibrational sensor, and a power consumption sensor.

* * * * *